US005862328A

United States Patent [19]
Colyer

[11] Patent Number: 5,862,328
[45] Date of Patent: Jan. 19, 1999

[54] BRIDGE FOR A CLIENT-SERVER ENVIRONMENT

[75] Inventor: Adrian Mark Colyer, Bitterne, United Kingdom

[73] Assignee: International Business Machines Corporation, Armonk, N.Y.

[21] Appl. No.: 709,087

[22] Filed: Sep. 6, 1996

[30] Foreign Application Priority Data

Sep. 15, 1995 [GB] United Kingdom .................... 9518871

[51] Int. Cl.⁶ .................................................. G06F 13/00
[52] U.S. Cl. ..................................... 395/200.33; 395/682
[58] Field of Search ..................................... 395/703, 700, 395/200, 200.09, 680, 200.51, 200.33, 3

[56] References Cited

U.S. PATENT DOCUMENTS

| 5,329,619 | 7/1994 | Page et al. | 395/200 |
| 5,442,749 | 8/1995 | Northcutt et al. | 395/200.09 |
| 5,452,459 | 9/1995 | Drury et al. | 395/700 |

FOREIGN PATENT DOCUMENTS

| 0501610 | 2/1992 | European Pat. Off. . |
| 0518195 | 12/1992 | European Pat. Off. . |
| WO95/17718 | 6/1995 | WIPO . |

OTHER PUBLICATIONS

G Gagnon, "Building a better app., SQL style", PC Magazine, V13, N10, PNE1 (7), May 31 1994.
S Roti, "SQL*NET version 2: client/server networking is easier with SQL*NET V and the MultiProtocol Interchange", DBMS, v5, n9, p16(2), Aug. 1992.
A Dave, M Sefika, R Campbell, "Proxies, Application Interfaces, and Distributed Systems, Proceedings of the Second International Workshop on Object Orientation in Operating Systems", 1992, pp. 212–220.
IBM Technical Disclosure Bulletin, vol. 36, No. 08, 1 Aug. 1993, pp. 457–458, "Use of System Object–Model Objects from Dynamic Languages".

*Primary Examiner*—James P. Trammell
*Assistant Examiner*—Matthew Smithers
*Attorney, Agent, or Firm*—Jeffrey S. Labaw

[57] ABSTRACT

A software bridge is introduced between a client and a server in a client-server distributed computing environment. The bridge presents the interface of a server to a client and the interface of a client to a server. The bridge is used for monitoring or logging of requests and associated data flowing between the client and the server, useful for example in problem determination. The bridge is also used for workload balancing between servers. It can further be used to reduce network connectivity between clients and servers. All of these advantages can be achieved without any modifications to existing client or server code.

16 Claims, 10 Drawing Sheets

BRIDGE FOR A CLIENT-SERVER ENVIRONMENT

FIELD OF THE INVENTION

The present invention relates to distributed computing in a client-server environment and more particularly to the use of bridges between clients and servers in such an environment.

BACKGROUND OF THE INVENTION

Overview of Object-Oriented programming

Prior to the development of object-oriented programming, a form of programming known as structured programming was in use is still used extensively. In this technique, various functions are first defined, and the program then consists of calling such defined functions at appropriate times to effect the overall objective of the application program. Such functions define the methods that are used to operate on the data, but do not define the data itself. Structured programming provided the opportunity of a modularised approach—a significant improvement over "spaghetti code" which was difficult to debug and maintain. Nevertheless, several drawbacks to structured programming remain, such as the "semantic gap" between the concepts and entities in the world being modelled by the program and the concepts in the programming language, the textual nature of the program code, and limitations on reusability of code modules.

Subsequently, a new programming paradigm was developed, referred to as object-oriented programming. In this technique, instead of defining functions, "classes" are defined. The class definitions define the methods which any instance of that class can perform and the attributes (or data) that an instance of that class contains. An object is a member of a class and can actually perform the methods which are defined in the class definition. An object has values associated with each of the attributes defined by the class. An object has zero or more attributes and it has zero or more methods that can be performed on the object.

The interface to the object is the way in which the attributes can be accessed through the methods. All objects derived from that class share the interface of that class. The implementation of an object is hidden from the application which calls the object. As long as the interface to the object does not change, the implementation may be completely altered without affecting the application.

As a simplistic example of this technique of describing the external "appearance" of an object without the necessity of describing what it "looks like" or "does" inside, and in order to illustrate the significant benefits of such object-oriented programming, one might imagine, by analogy, a common household toaster, which could be modeled by the object-oriented approach. The external "interface" would consist of the knob, which essentially represents a parameter for adjusting the desired lightness or darkness of the toast, the slot into which the bread is inserted, and a lever for effecting the insertion and activating the toaster. The important concept is that the end-user of such an appliance does not need to know the "internals" of the toaster in order to use it, e.g. whether heat is provided by electricity, or by chemical or other means. All the user would have to do is interface properly with these externals.

The beauty of this evolution in programming is that, continuing with the analogy, the designer of the object, which might be a module of programming code modelling a toaster, may focus on improving the internals of the toaster, making it more efficient, for example, without affecting the user's ability to use the object, in as much as the internals are transparent to the user. Thus, more abstractly, object-oriented technology may be seen essentially as providing the advantage of separation of the interface of an object from its implementation. In a software context, the internals of the object may thereby be rewritten and improved without the necessity of rewriting the entire application program, as long as the external "knobs" etc, and their expected behaviour have not changed.

For further general background regarding object technology to facilitate a better understanding of the invention, reference should be made to "Object Oriented Technology—A Manager's Guide", by David A. Taylor, copyright 1990, Servio Corporation.

With the development of object-oriented programming, several "object models" were further refined and developed by various organisations and software companies. These specified the manner in which one was to define objects and their external interfaces, such various object models providing characteristics of encapsulation and inheritance among others. At an appropriately high level, these various object models are very similar. Examples are the System Object Model (SOM), Common Lisp Object System (CLOS), Smalltalk, and C++. In essence, these various object models are simply a body of rules answering the question of what an object is, each offering slightly different answers when examined at lower levels. For example, various object models differ in their language syntax, and in how encapsulation and inheritance work.

As a direct result of these differences, one problem presented by the availability of different object-oriented languages and object models was that interoperability between object programs written in a mixture of such languages could not be achieved. This problem adversely impacted one of the major promises of object technology, namely reusability of code. In an effort to address this problem plaguing the industry, a Common Object Request Broker Architecture (CORBA) was arrived at by committee, which included a standardized Interface Definition Language (IDL). There was in essence an agreement in the industry as to how interfaces of an object would be specified, i.e. a standard for defining object interfaces so that objects defined by one vendor could be utilized by another. See "The Common Object Request Broker:Architecture and Specification", OMG Document Number 91.12.1 Revision 1.1.

Object Request Broker (ORB)

The Object Request Broker (ORB) described in the CORBA architecture is analogous to the Remote Procedure Call (RPC) familiar to those working in the UNIX operating system environments (UNIX is a trademark exclusively licensed through X/Open Co. Ltd).

Figure 1:
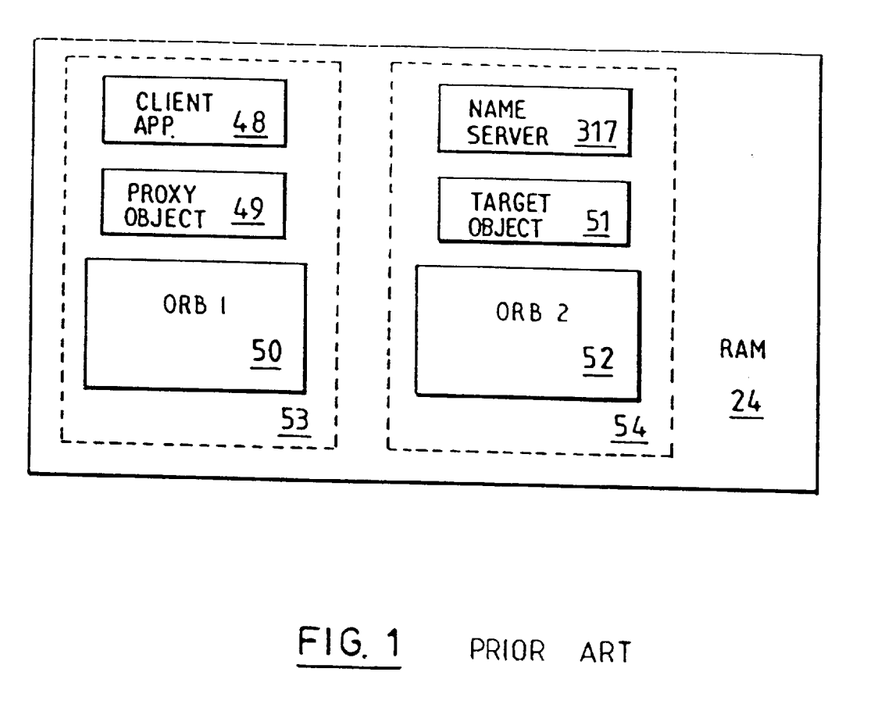
FIG. 1 is a block diagram of a prior art Object Request Broker located in a client/server environment.

A prior art system is illustrated in FIG. 1, which is a block diagram of a prior art Object Request Broker located in a client/server environment.

The ORB is split into two parts, part 50 of which executes in each of the clients using the ORB and part 52 of which executes in each of the servers supporting the ORB. Like an RPC, an ORB is a mechanism which allows client applications 48 working in one address space 53 to communicate with objects 51 in another address space 54. Objects 51 located in the other address space 54, that is not the same address space 53 as that in which the client application 48 is executing, are referred to as "remote" objects. Objects located in the same address space 53 as the client application 48 are referred to as "local" objects. An ORB 50 intercepts a call from a client application 48 in one address space 53, encapsulates it into a network protocol, decodes the call for the target object 51 in another address space 54 and returns the results back to the calling client application 48. This allows a client application 48 working in one address space (local) to communicate with objects 51 in another address space (remote). ORB is an improvement upon the RPC as it is designed to provide the higher level of flexibility and power offered by object oriented programming. The function of a proxy object 49 will be discussed further below.

"Object models" have been developed by various organisations and software companies. The object models specify the manner in which objects and their external interfaces are to be defined. One of these object models is System Object Model (SOM) from IBM Corporation. In SOM, all applications using objects run in a single address space in which the objects are also located. A development within SOM is a framework of object classes called Distributed System Object Model (DSOM). In DSOM, applications (running in clients) in one address space may access objects in another address space (such as an address space belonging to a server). These address spaces may be in the same or different systems. In fact, the systems need not be running the same platform. For example, a client application running in an address space on an OS/2 system may access an object that is located in an address space on an AIX/6000 system, or vice versa. Both SOM and DSOM are described in "SOMobjects: A Practical Introduction to SOM and DSOM", published by IBM Corporation, Copyright 1994, Order no. GG24-4357-00.

European Patent Application 0 501 610 discloses a mechanism which allows objects in different processes to communicate. Programs are explicitly written to use the communications Application Programming Interface (API).

The aforementioned System Object Model (SOM) is one object model which conforms to CORBA and IDL. Conformance means that SOM objects follow CORBA semantics, and SOM objects are defined in IDL syntax.

The DSOM framework provides object implementations that insulate the client programmer from having to have knowledge of the location or platform type where a target object will be instantiated. The communications facilities used for this inter-process communication are completely hidden from the programmer.

Client-Server architecture

In a client-server architecture, application programs are divided into distinct tasks that execute as individual components. Each of the components are assigned roles as clients or as servers. A single component may perform the role of a server for some purposes and of a client for other purposes. Each of the components operates independently and assumes certain responsibilities. Those components which are assigned the role of client request services from a server by making method calls on an object in a server process. Those components which are assigned the role of server provide services by receiving these method calls, invoking them on the appropriate object and returning the results to the client. The clients and servers exchange messages using a predefined protocol. Servers can service many clients and clients can draw upon the services of many servers.

In such a system, unless the client or the server have specific code within them, it is not possible to monitor or to log the requests which are made by the client of the server, or to monitor or to log data associated with such requests. It may be desired to monitor or to log such requests for the purposes of problem determination.

In the system described above, workload balancing between servers is not possible, unless the client has been designed to include such workload balancing within the client itself. Disadvantages of including such workload balancing within the client itself are the overhead associated with each request within the client and the complexity introduced into each of the clients including such workload balancing. Workload balancing is desirable in order to improve the overall performance for the client by choosing the server which will offer the best performance.

It is necessary to have a communications link between each of the clients and each of the servers for which it is desired for the client to be able to request services from. In a system where there are many clients and many servers, this results in considerable complexity.

BACKGROUND ART

Function shipping enables application programs to access files owned by another system by shipping file control requests and to transfer data to or from transient-data and temporary-storage queues in other systems by shipping requests for transient-data and temporary-storage functions. It also allows initiation of transactions in other systems that implement SNA LU Type 6 protocols. Entries in a resource definition table allow the system programmer to specify that the named resource is not on the local (or requesting) system but on a remote (or owning) system. The use of function shipping is transparent to both the requesting and the remote system. Logging and monitoring of requests and associated data are possible, but must be implemented separately for each application in which it is desired to have such monitoring. Further information on function shipping can be found in "CICS/ESA V4.1 Intercommunication Guide", published by IBM Corporation, Copyright 1977, 1994, Order no. SC33-1181-00.

Proxies can be used to allow access to remote resources in a server from a local application running in a client. A proxy is an object, such as proxy object 49 in FIG. 1, that represents another object, receives its messages, and processes them in some way. This often includes forwarding the message to the target object, such as 51 in FIG. 1. Proxies are a well-known technique in object-oriented programming, and are used by DSOM (Distributed System Object Model)—see the SOMobjects Developer Toolkit User's Guide Version 2.0, included in SoMobjects Publications, published by IBM Corporation, Copyright 1994, Order no. S96F-8649 for details. A proxy receives request messages from a client to be sent to a server, and receives return messages from the server to be sent to the client. It cannot receive asynchronous return messages from the server for the client. A proxy is generally associated with a single target object in a server and not with multiple objects in a single server or in multiple servers.

European Patent Application 0 518 195 discloses a platform-independent Application Programming Interface (API) implemented through library routines linked to application programs. The application programs are specifically written to the API and the client and server processes must have explicit knowledge of the API and make use of it. The problem with this implementation is that it does not provide a transparent mechanism for intercepting client-server flows without the client and server being aware of the re-direction.

PCT Patent Application WO 95/17718 discloses an object-oriented interface to Remote Procedure Calls (RPCs)

which is integrated with the operating system. Client and server programs are specially written to make use of the RPC Application Programming Interface (API) when communicating with each other. This implementation also does not provide a transparent mechanism for intercepting client-server flows without the client and server being aware of the re-direction.

PC Magazine, v13, n10, 31 May 1994, Gagnon G, "Building a better app, SQL style" discloses a method whereby a common API can be mapped to many differing APIs.

DBMS, v5, n9, August 1992, Roti S, " SQL*NET version 2: client/server networking is easier with SQL*NET V2 and the MultiProtocol Interchange" discloses an intermediate component which translates from one API to another API. The intermediaries are specifically written to perform the translation task which is required of them. Without the intermediary, the components written to the two API's do not communicate.

SUMMARY OF THE INVENTION

The invention provides a bridge for use between a client and a server in a distributed object-oriented computer system, the bridge defining an interface to the client that corresponds to the interface of a server and an interface to the server that corresponds to the interface of a client.

In a first embodiment, the client and the server operate asynchronously, the bridge is derived from a client class and a server class by inheritance, the bridge overrides methods inherited from the server to record the name of the client making the request and to forward the request to the server and the bridge overrides methods inherited from the client class to forward reply parameters to the client.

In a second embodiment, the client and the server operate synchronously, the bridge is derived from a server class by inheritance and the bridge overrides methods inherited from the server to invoke the methods on the server and to forward reply parameters to the client.

In a preferred embodiment, the bridge further comprises means to monitor and log requests between the client and the server and data associated with such requests. Also, in a preferred embodiment, the bridge further comprises means for performing workload balancing between servers. Such workload balancing may be by measuring response times and directing client requests to servers in response to the measured response time. In a further preferred embodiment the bridge is connected to m clients and n servers (where n and m are integers greater than or equal to 2) and the bridge reduces the number of network connections from n*m to n+m.

Preferably, the distributed object-oriented computer system is a CORBA compliant system and the distributed object-oriented computer system uses DSOM class libraries. However, the invention is not limited to application in such systems or using such class libraries. For example, the distributed object-oriented system could conform to Microsoft's Component Object Model (COM), or it could use class libraries from Distributed Object Management Facility (DOMF) available from SunSoft as Distributed Object Environment and from Hewlett Packard Co. as ORB Plus.

The invention also provides a method of operating a distributed client-server computer system comprising the steps of defining an interface, for a bridge, to the client that corresponds to the interface of a server, and defining an interface to the server that corresponds to the interface of a client.

In a first embodiment, the client and the server operate asynchronously, and the step of defining an interface to the client comprises deriving the client interface from a server class by inheritance, and overriding methods inherited from the server class to record the name of the client making the request and to forward the request to the server, and the step of defining an interface to the server comprises deriving said server interface from a client class by inheritance, and overriding methods inherited from said client class to forward reply parameters to said client.

In a second embodiment, the client and the server operate synchronously, and the step of defining an interface to the client comprises deriving the client interface from a server class by inheritance, and overriding methods inherited from the server class to invoke the method on the server and to forward reply parameters to the client.

The invention also provides a distributed object-oriented computer system comprising one or more servers, one or more clients and a bridge as described above.

Yet further, the invention provides a computer program product on a computer readable memory for operating a distributed client-server computer system, the computer program product comprising means for defining an interface, for a bridge, such that the interface to a client corresponds to the interface of a server and the interface to a server corresponds to the interface of a client, and means for transparently inserting said bridge between said client and said server.

BRIEF DESCRIPTION OF THE DRAWINGS

Embodiments of the invention will now be described, by way of example, with reference to the accompanying drawings, in which.

DETAILED DESCRIPTION OF THE INVENTION

Suitable hardware in which the invention may be implemented

The invention may be run on a variety of computers or collection of computers under a number of different operating systems. The computer could be, for example, a personal computer, a mini computer, mainframe computer or a computer running in a distributed network of other computers. Although the specific choice of computer is limited only by memory and disk storage requirements, computers in the IBM PS/2 series of computers could be used in the present invention (IBM is a registered trademark and PS/2 is a trademark of IBM corporation). For additional information on IBM's PS/2 series of computers, the reader is referred to Technical Reference Manual Personal System/2 (Model 80) IBM Corporation Part No. 68X 2256 Order Number S68X-2254. One operating system which an IBM PS/2 personal computer may run is IBM's OS/2 2.0, for more information on the IBM OS/2 2.0 Operating System the reader is referred to OS/2 2.0 Technical Library, Programming Guide Vol. 1, 2, 3 version 2.00 Order Nos. 10G6261, 10G6495, 10G6494 (OS/2 is a trademark of IBM Corporation).

In the alternative, the computer system might be in the IBM RISC System/6000 line of computers which run on the AIX operating system (RISC System/6000 and AIX are trademarks of IBM Corporation). The various models of the RISC System/6000 are described in many publications of the IBM Corporation for example, RISC System/6000, 7073 and 7016 POWERstation and POWERserver Hardware Technical Reference, Order No. SA23-2644-00 (POWERstation and POWERserver are trademarks of IBM Corporation). The AIX operating system is described in General Concepts and Procedure—AIX Version 3 for RISC System/6000 Order No. SC23-2202-00 as well as other publications of the IBM Corporation.

Figure 2:
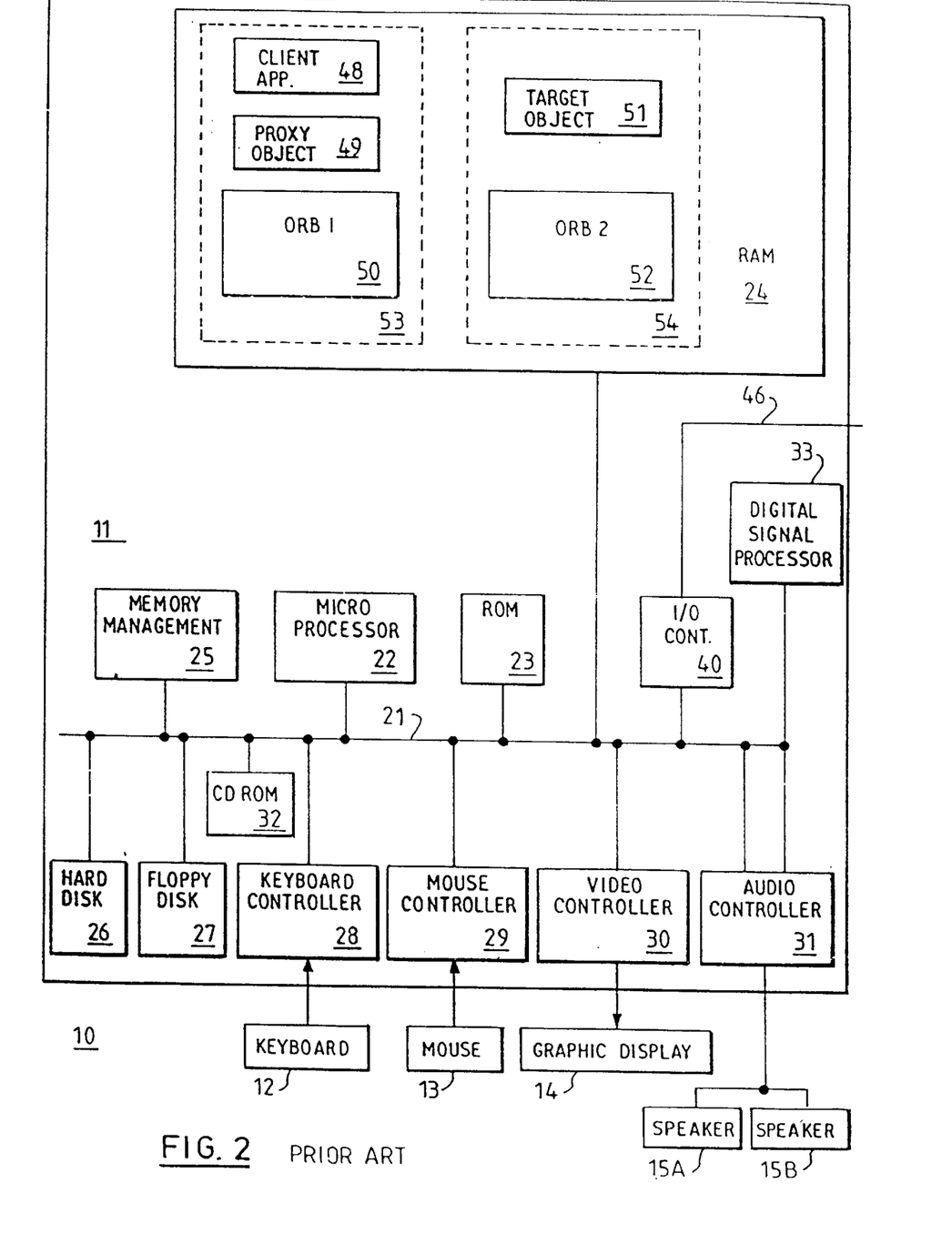
FIG. 2 is a block diagram of a prior art computer system suitable for use with the present invention.

In FIG. 2, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or other microprocessors from Hewlett Packard, Sun, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. An I/O controller 40 such as a Token Ring Adapter enables communication over a network 46 to other similarly configured data processing systems.

In one of the preferred implementations of the invention the set of instructions 48–52, previously described with reference to FIG. 1, resident in the random access memory 24 of one or more computer systems configured generally as described above. Until required by the computer system, the set of instructions may be stored in another computer memory, for example, in the hard disk drive 26, or in a removable memory such as an optical disk for eventual use in the CD-ROM 32 or in a floppy disk for eventual use in the floppy disk drive 27. The memory address spaces coupled together by means of the ORBs can be resident in separate systems communicating over the network 46 or can be two or more address spaces 53, 54 in the memory of a single computer system as depicted in FIG. 2.

Bridge

Figure 3:
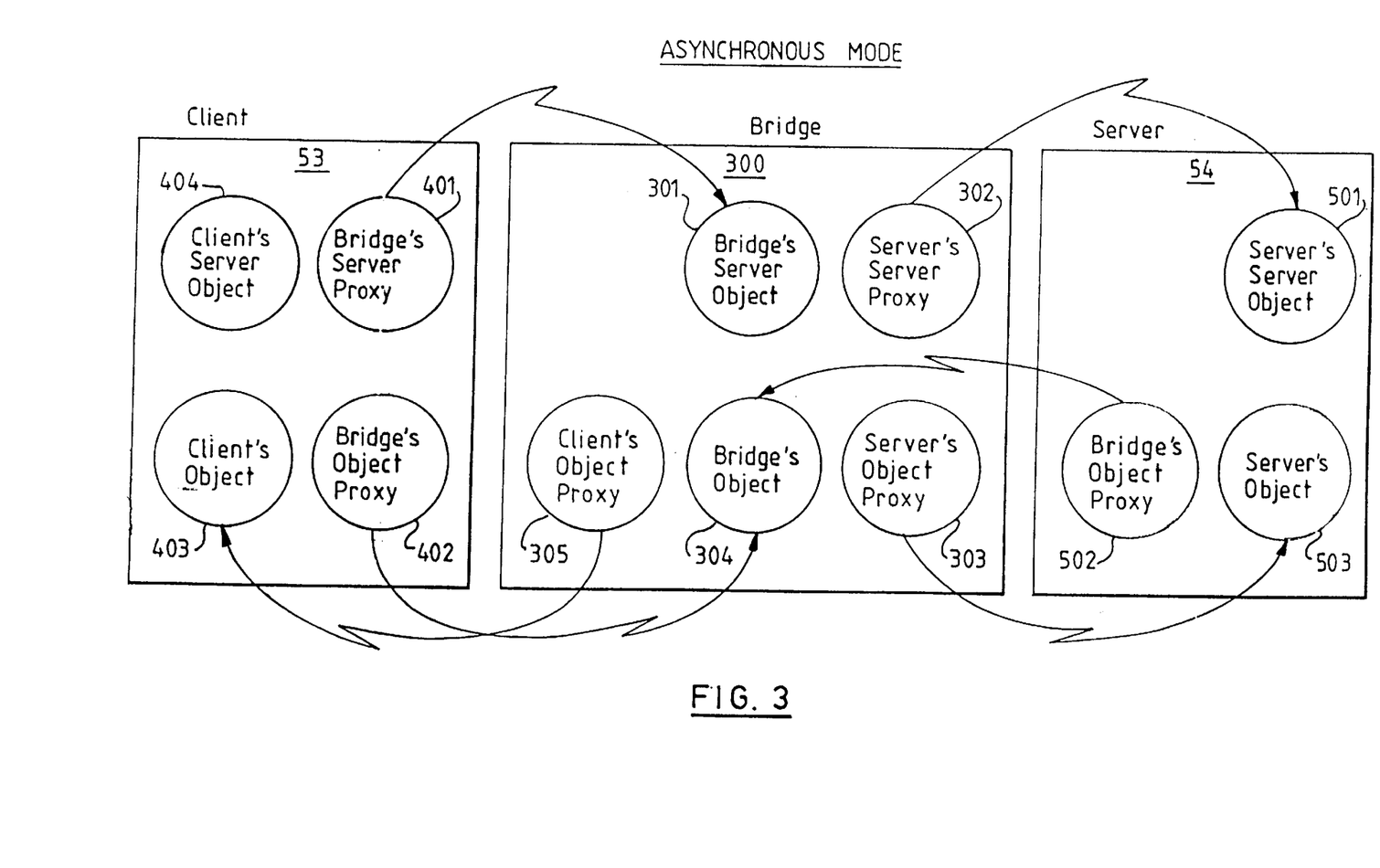
FIG. 3 is a block diagram of a system including a prior art client and server configured to operate asynchronously, together with a bridge of the present invention.

Referring to FIG. 3, in the present invention, a bridge 300 is introduced between the client 53 and the server 54. The purpose of the bridge 300 is to receive requests from the client 53 destined for the server 54, forward the requests to the server 54, receive replies from the server 54 destined for the client 53 and forward the replies to the client 53. The bridge 300 presents an interface to the client 53 corresponding to that of the server 54 and an interface to the server 54 corresponding to that of the client 53. In this way, neither the client 53 nor the server 54 can determine the existence of the bridge 300 and both operate as if it were not there.

Two embodiments of the invention are described, one for operation in an asynchronous environment and one for operation in a synchronous environment. In an asynchronous environment (shown in FIG. 5), the client 53 continues other processing whilst waiting for a reply from the server 54. In a synchronous environment (shown in FIG. 8), client 53 waits for a reply from server 54 before continuing processing.

Asynchronous environment

Referring again to FIG. 3, which includes the components parts of a bridge 300 for use with a client and server operating in an asynchronous mode. The client 53, the bridge 300 and the server 54 all include, what in DSOM terminology is called a Server Object. These are shown respectively as Client's Server Object 404, Bridge's Server Object 301 and Server's Server Object 501. These Objects are not to be confused with the functions which a server performs or with the server itself. A Server Object is an object which manages objects within a server to allow client applications to create and destroy objects in servers. It also identifies which object within a server should handle a request and dispatches such requests, received by it for the server, to the identified object for execution.

Client 53 contains at least one object called the Client's Object 403, which is the initiator in the client of the request for service to be provided from the server 54. A client application (not shown) makes calls to Client's Object 403 to perform operations on data. These operations are either completed locally within the Client's Object 403 itself, or they are completed remotely by means of the Client's Object 403 requesting services from a server 54. Server 54 contains at least one object called the Server's Object 503 (not to be confused with a Server Object). This corresponds to a target object described earlier with reference to FIGS. 1 and 2. This is the object that actually provides the services which are requested by the Client's Object 403. Bridge 300 contains an object called the Bridge's Object 304 which provides the functions of the bridge itself.

Proxy objects

The client 53, the bridge 300 and the server 54 all include, what in DSOM terminology are called proxy objects. A proxy object is an object that is a local representative for a remote target object. A proxy object inherits the target object's interface, so that it responds to the same methods. Methods invoked on the proxy object are not executed locally, but are forwarded to the real target object for execution. A program running in a client always has a local proxy object, in the client, for each remote object, in a server, on which it operates. The proxy object contains, within it, a pointer to the memory location in the server where the target object is located. The proxy object is created by the DSOM run-time environment whenever a request is made to a remote server to invoke a method on a remote object.

Client 53 contains a proxy object called Bridge's Server Proxy 401 which is the local representative of the Bridge's Server Object 301. The client believes that this represents the Server's Server Object 501 in the server providing the services. Similarly, bridge 300 contains a proxy object called Server's Server Proxy 302 which is the local representative of the Server's Server Object 501. As was explained above a Server Object is an object which manages objects within the server.

Client 53 also contains a proxy object called Bridge's Object Proxy 402 which is the local representative of the Bridge's Object 304. The client believes that this represents the Object 503 in the server providing the services. Similarly, bridge 300 contains a proxy object called Server's Object Proxy 303 which is the local representative of the Server's Object 503. These proxies are used in the communications between client 53 and server 54 which are initiated by the client 53. In an asynchronous system, communications are also initiated by server 54 when it has a reply for the client 53. These communications are achieved by means of a Bridge's Object Proxy 502 located in the server 54 enabling the server 54 to communicate with the bridge 300 and by means of a Client's Object Proxy 305 located in the bridge 300 enabling the bridge 300 to communicate with the client 53.

As can now be seen from the description above, the objects and proxy objects shown in FIG. 3 located in the upper part of each of the blocks depicting client 53, bridge 300 and server 54 are used in the creation, destruction and location of objects by the client and bridge. The objects and proxy objects shown in FIG. 3 located in the lower part of each of the blocks depicting client 53, bridge 300 and server 54 are used in the communication process between client 53, bridge 300 and server 54.

Figure 4:
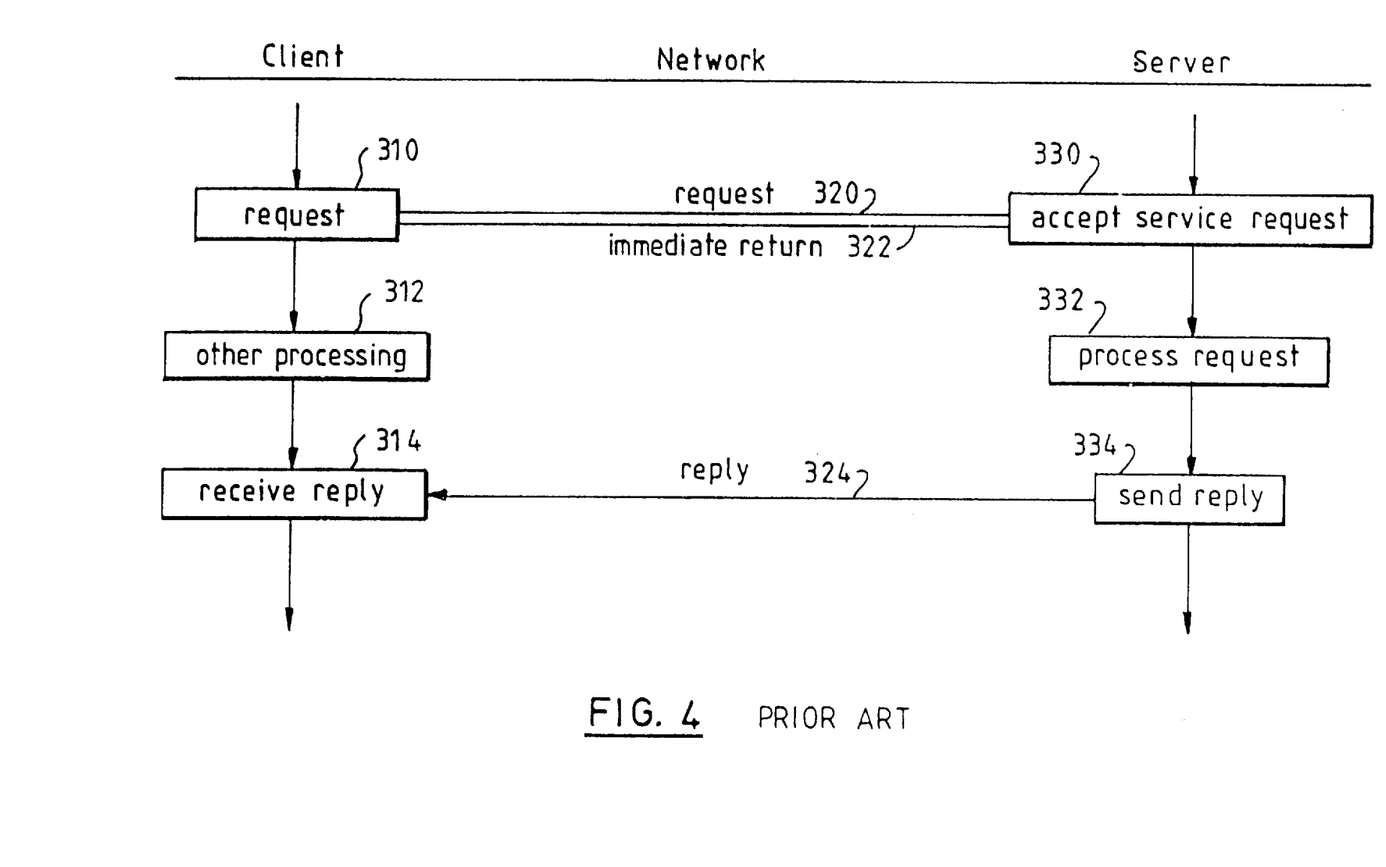
FIG. 4 is a flow diagram of the asynchronous operation of a prior art client and server.

FIG. 4 shows the interactions between a prior art client and a prior art server via a prior art network in an asynchronous environment. In an asynchronous environment the client initiates a communication with the server by making a request of the server to provide a service. The server acknowledges the request and the client continues with other processing. The server may complete the request after a delay whilst it too may be completing other processing. When the server has completed the request it initiates another communication with the client by providing the client with a reply. This communication is initiated by the "server" effectively making a request to the "client", that request being to accept the reply from the previous request. In these circumstances, it may be considered that the "server" and the "client" have reversed roles, with the server "requesting" the client to accept the reply. This is the reason why the client requires a Server Object when operating asynchronously.

At step 310, the client makes a request for a service to be provided from the server. This request is transmitted via a network to the server at step 320. The server sends an immediate acknowledgement to the client at step 322. The server accepts the service request at step 330 and proceeds to process the service request at step 332. Whilst the server is processing the request, the client is completing other processing at step 312. The server may also be processing other requests prior to this request being processed. On completion of processing of the request at step 332, the server sends a reply 324 to the client at step 334. The reply is received at step 314 and the client continues processing.

Figure 5:
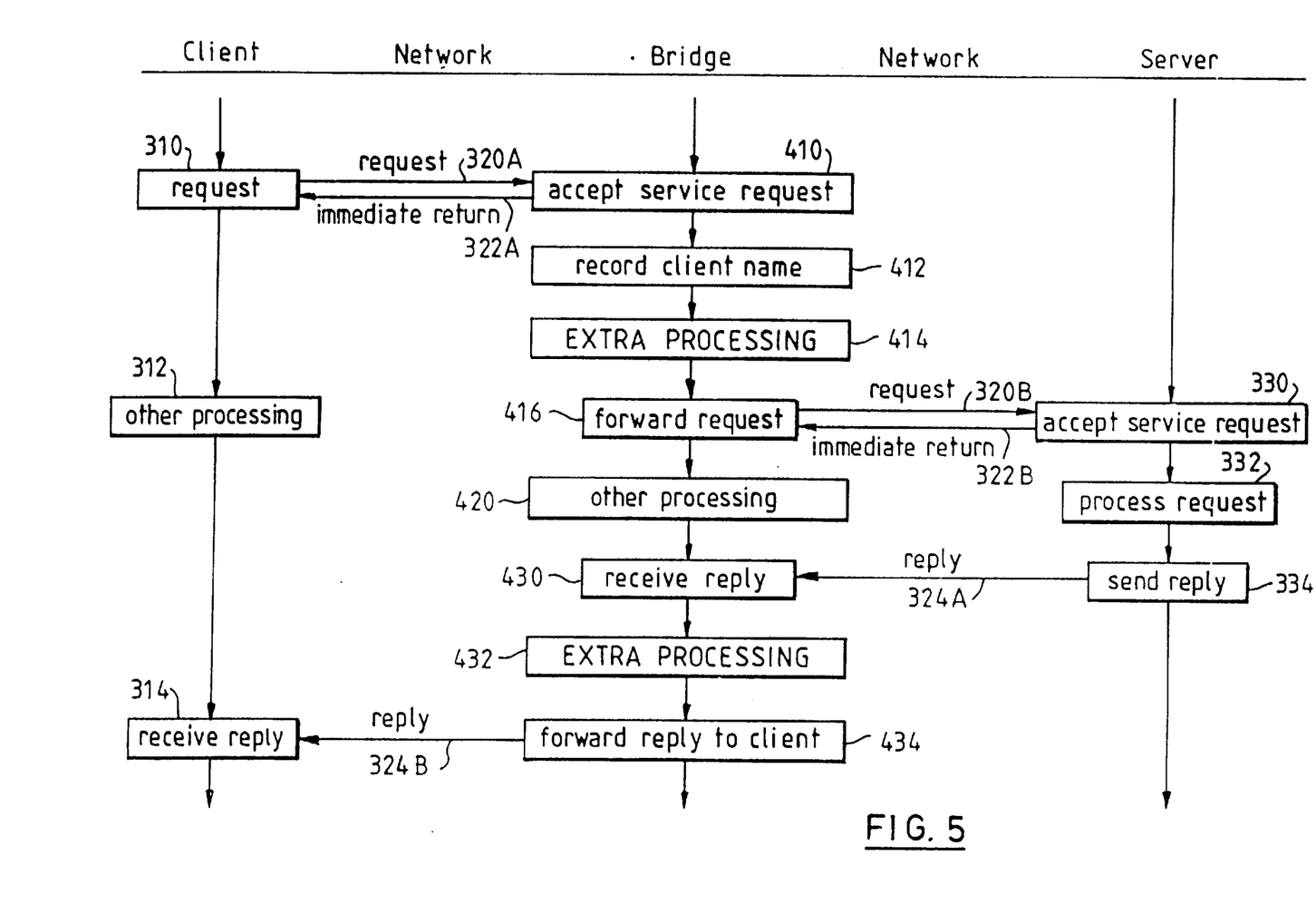
FIG. 5 is a flow diagram of the asynchronous operation of the system of FIG. 3 according to present invention.

FIG. 5 shows the interactions which occur when a bridge is inserted into the asynchronous system of FIG. 4. The interactions of the client at steps 310, 312 and 314 are the same as in FIG. 4, as are the interactions of the server at steps 330, 332 and 334. Request 320, Immediate return 322 and Reply 324 are split into corresponding responses between the client and the bridge and between the bridge and the server. The operation of the bridge in response to these interactions will now be described. A request 320A is transmitted from the client to the bridge at step 310. The bridge sends an immediate acknowledgement 322A to the client at step 410 and the bridge accepts the service request 320A. Instead of processing the request, the bridge records the client name at step 412 and completes any extra processing at step 414.

This extra processing may be any extra processing that it is desired to complete on the request from the client or on its associated data. Such processing may make changes to the request or the associated data or it may leave it unchanged. Examples of such processing include:

1. The fact that the method detailed in the request was called with parameters equal to the data associated with the request may be logged;

2. Processing may be done to determine which of a number of servers this request is to be routed to in order to perform workload balancing between servers, the results of such processing being used to determine where the request is routed to; or 3. The request may be checked to see which server the client thought that it was sending the request to, and then routed by the bridge to that server.

At step 416, the bridge forwards the service request 320B to the server. The server sends an immediate acknowledgement 322B to the bridge at step 330. Whilst the server is processing the request, the bridge is completing other processing at step 420. On completion of processing of the request by the server at step 332, the server sends a reply 324A to the bridge at step 334. The reply is received at step 430 and any extra processing, such as logging the parameters returned from the server to the client is performed by the bridge at step 432. The bridge then forwards the reply 324B to the client at step 434.

A bridge (300 in FIG. 3) is derived from a client object and a server object by inheritance. This means that the interface (that is all of the attributes and methods) of both the client object and the server object are inherited by the bridge. Example 1 shows how a bridge is defined in the IDL language for an asynchronous system.

EXAMPLE 1

Definition of an Asynchronous Bridge Class

```
// Define an asynchronous bridge class
    #include "server_obj.idl"    // declaration of server
class
    #include "client_obj.idl"    // declaration of client
class
        // The above lines include the methods and attributes
of both the
        // server and client classes
    interface client_server_obj : client_obj,server_obj
        // The above line defines the interface of the
asynchronous bridge
        // as having all of the feature of both a client
class and
        // a server class
    {
```

Synchronous environment

Figure 6:
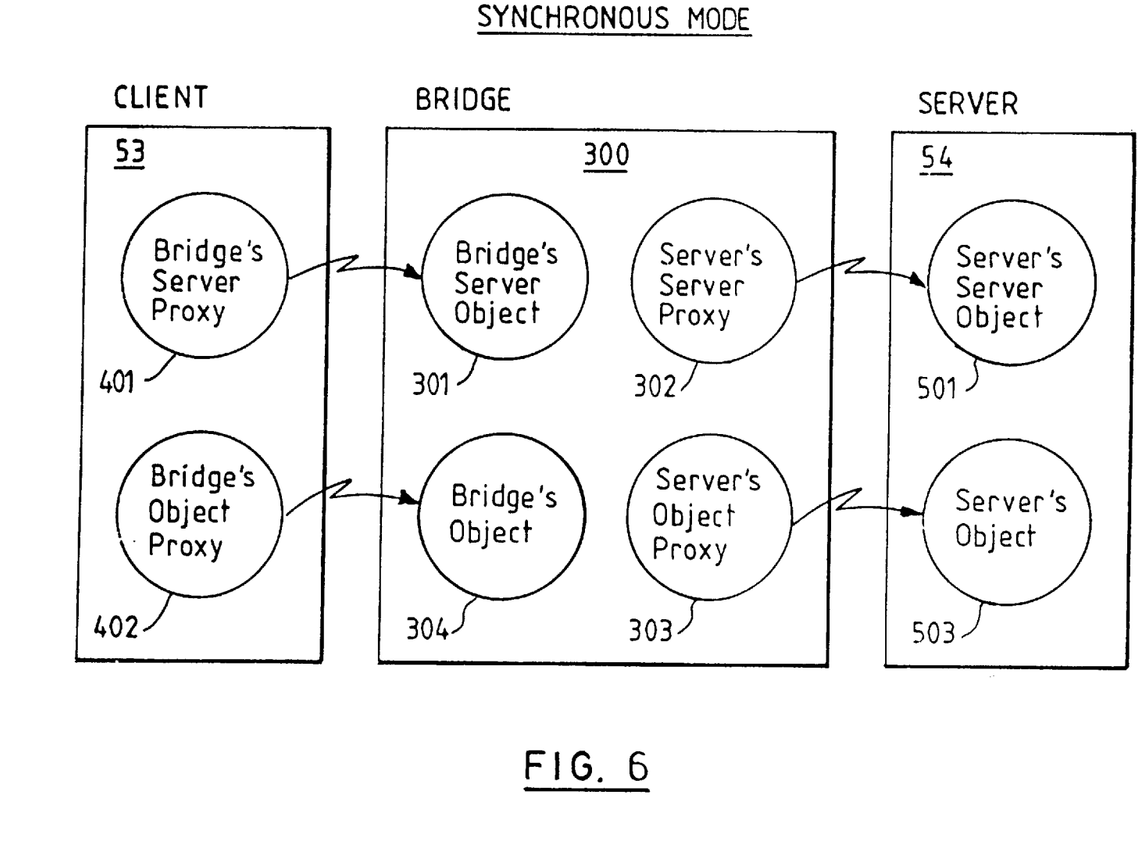
FIG. 6 is a block diagram of a system including a prior art client and server configured to operate synchronously, together with a bridge of the present invention.

Referring to FIG. 6, which includes the components parts of a bridge 300 for use with a client 53 and a server 54 operating in a synchronous mode. The bridge 300 and the server 54 include a Server Object. These are shown respectively as Bridge's Server Object 301 and Server's Server Object 501. Server 54 contains at least one object called the Server's Object 503 (not to be confused with a Server Object). This is the object that actually provides the services which are requested by the client. Bridge 300 contains an object called the Bridge's Object 304 which provides the functions of the bridge itself.

Client 53 contains a proxy object called Bridge's Server Proxy 401 which is the local representative of the Bridge's Server Object 301. The client believes that this represents the Server's Server Object 501 in the server providing the services. Similarly, bridge 300 contains a proxy object called Server's Server Proxy 302 which is the local representative of the Server's Server Object 501. As was explained above a Server Object is an object which manages objects within the server.

Client 53 also contains a proxy object called Bridge's Object Proxy 402 which is the local representative of the Bridge's Object 304. The client believes that this represents the Object 503 in the server providing the services. Similarly, bridge 300 contains a proxy object called Server's Object Proxy 303 which is the local representative of the Server's Object 503. These proxies are used in the communications between client 53 and server 54 which are initiated by the client 53.

In a synchronous system, communications are initiated only by the client 53. These communications are achieved by means of the Bridge's Object Proxy 402 located in the client 53 enabling the client 53 to communicate with the bridge 300 and by means of a Server's Object Proxy 303 located in the bridge 300 enabling the bridge 300 to communicate with the server 54.

As can be seen from FIG. 6, the objects and proxy objects located in the upper part of each of the blocks depicting client 53, bridge 300 and server 54 are used in the creation, destruction and location of objects by the client and bridge. The objects and proxy objects located in the lower part of each of the blocks depicting client 53, bridge 300 and server 54 are used in the communication process between client 53, bridge 300 and server 54.

Figure 7:
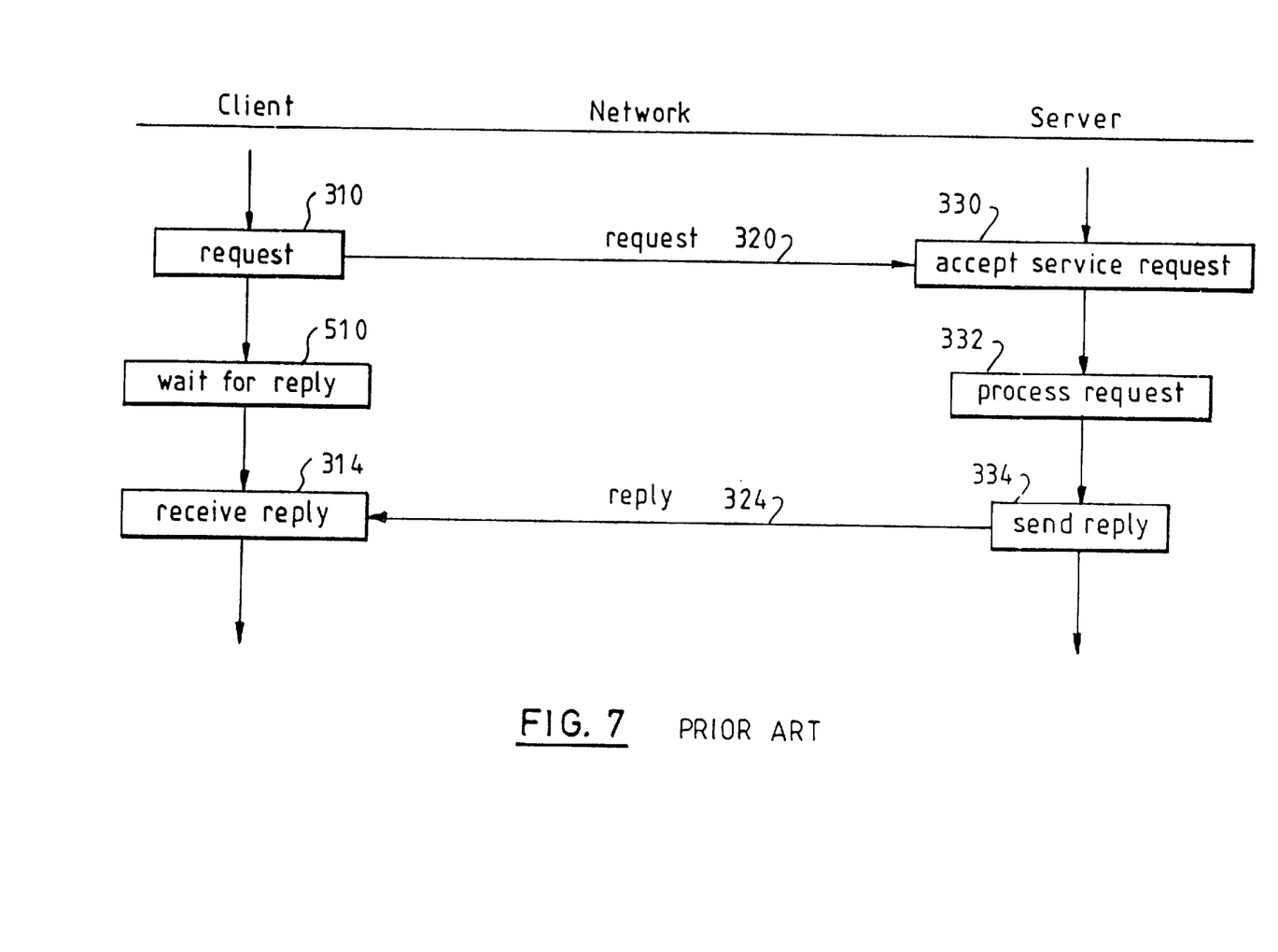
FIG. 7 is a flow diagram of the synchronous operation of a prior art client and server.

FIG. 7 shows the interactions between a prior art client and a prior art server via a prior art network in an synchronous environment. In a synchronous environment the client initiates a communication with the server by making a request of the server to provide a service. The server completes the request and returns the result to the client through a simple return from processing the request. The server does not initiate a communication with the client to pass the reply back. The client 53 simply receives the reply via return parameters from the method which it invoked on the server 54.

In the prior art system, there are two differences between operation in an asynchronous environment described above with reference to FIG. 4 and a synchronous environment. The first is that after the client has made a request for a service at step 310, the client does not complete other processing at step 312, but instead, at step 510, waits for a reply from the server. The second is that the server does not send an immediate acknowledgement to the client at step 322. Otherwise, the numbered steps in FIG. 7 are identical to the corresponding numbered steps in FIG. 4.

Figure 8:
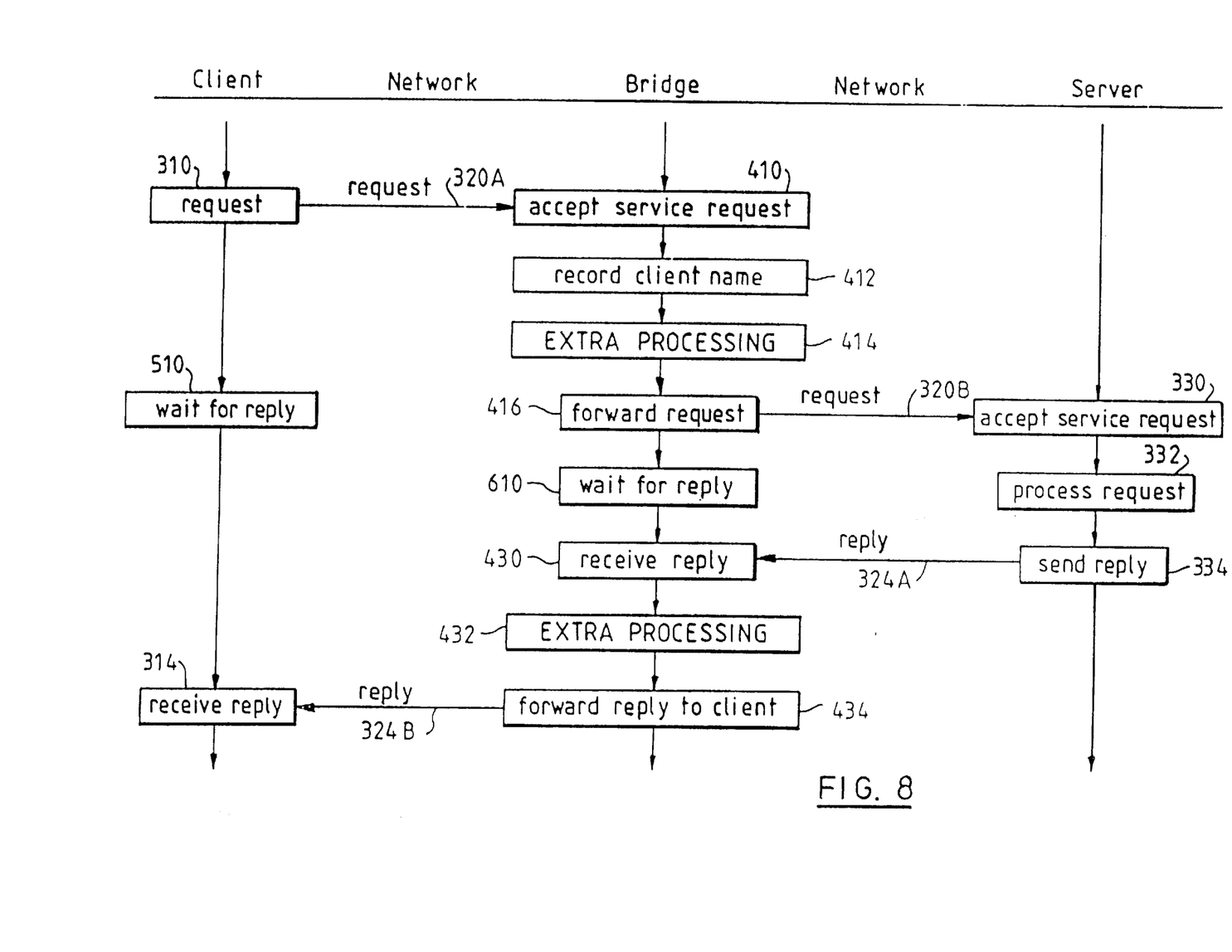
FIG. 8 is a flow diagram of the synchronous operation of the system of FIG. 6 according to present invention.

FIG. 8 shows the interactions which occur when a bridge is inserted into the synchronous system of FIG. 7. The interactions of the client at steps 310 and 314 are the same as in FIG. 7, as are the interactions of the server at steps 330, 332 and 334. Request 320 and Reply 324 are split into corresponding responses between the client and the bridge and between the bridge and the server. The operation of the bridge in response to these interactions will now be described.

At step 410 the bridge accepts the service request 320A. Instead of processing the request, the bridge records the client name at step 412 and completes any extra processing at step 414. This extra processing may include any or all of the items of extra processing described above in connection with the asynchronous environment and with reference to FIG. 5. At step 416, the bridge forwards the service request to the server. Whilst the server is processing the request, the bridge is waiting for a reply from the server at step 610. On completion of processing of the request by the server at step 332, the server sends a reply 324A to the bridge at step 334. The reply is received at step 430 and any extra processing, such as logging the parameters returned from the server to the client is performed by the bridge at step 432. The bridge 300 then forwards the reply 324B to the client at step 434.

As can be seen from the description above, the client operates synchronously with the bridge and so the interface that the client sees from the bridge is the same as if the client were communicating directly with the server. The bridge operates synchronously with the server and so the interface that the server sees from the bridge is the same as if the server were communicating directly with the client.

A bridge is derived from a server only. There is no need for explicit client objects, since a client 53 simply invokes a method upon a server 54, and receives the reply via return parameters in that same method. No separate communication is initiated by the server 54. Example 2 shows how a object 300 is defined for a synchronous system.

EXAMPLE 2

Definition of a Synchronous Bridge Class

```
// Define a synchronous bridge class
    #include "server_obj.idl"    // declaration of server
    class
        // The above line includes the methods and attributes
```

-continued

```
of the
    // server class
interface client_server_obj : client_obj,server_obj
    // The above line defines the interface of the
synchronous bridge
    // as having the features of the server class
interface bridge_obj : server_obj
{
```

Insertion of bridge

The structure and definition of a bridge has been defined above, both for asynchronous operation and for synchronous operation. Having defined a bridge for use in either of the modes of operation, it is necessary to transparently insert the defined bridge between the client and the server, so that when a request to create a server is made, a bridge with the full interface of a server object is created instead.

The client 53 and server 54 contain instances of respective client and server classes. There are many different methods which can be used for finding remote objects, for creating an instance of a remote object and for invoking methods on remote objects.

A typical representative prior art method will now be described, referring back to FIG. 1.

1. A DSOM Object Manager (SOMD_ObjectMgr) (located in 50) will either have been created when the client was initialised or must be created now by calling the SOMD_Init() function, which is available in the client 53 as part of the Object Request Broker 50.

2. The client 53 executes a method on the SOMDObject_Mgr in order to locate a server 54 of an appropriate object class for use with the client 53. SOMDObject_Mgr creates a proxy object (located in 50) in the client 53 as a local representative for the Server Object (located in 52) on the remote server 54. Note that no Server Object yet exists in the remote server 54.

3. The client 53 issues a somdCreateObj() method call on the server proxy object. Included as a parameter in the method call is the class of target object 51 which the client wishes to create. Communication with the remote server is established and a Server Object (not shown) of the appropriate class created on the remote server 54. Once the Server Object (not shown) is created, it creates a target object 51 of the requested class in the server 54 itself. As part of the return parameters, information is supplied to the client 53 to enable it to create a proxy object 49 for the target object 51.

4. The client is now able to issue method calls on its local proxy object 49, which are executed on the target object 51 and the results returned to the client 53.

There may be more than one class of Server Object. For example, there may be a class of servers for use in providing printing services, another for file storage services and another for communications services. In the prior art, these communicate with each other without the aid of the present invention.

The method by which the bridge is transparently inserted between the client and the server will now be described with reference to FIG. 3.

A bridge class is created corresponding to each of the prior art Server Object classes. Server's Server object 501 is an instance of a prior art Server Object class. Bridge's Server Object 301 is a subclass of the default server class. In the example given above, there may be a bridge class of servers for use in providing printing services, another for file storage services and another for communications services.

The Server Object (inherited from the server class) within the definition of each bridge server class is modified, so that when Bridge's Server Object 301 is created as a member of a bridge server class, it includes the modifications. The modifications are to the method which creates target objects, and to the method which dispatches methods received by the Server Object to target objects in the server.

The modified method for the creation of Server's Object 503 (a target object) takes the request from the client to create a Server's Object 503 in a server and constructs a Bridge Object 304 in its place.

The modified method which dispatches methods received by the Bridge's Server Object 301 to Server's Objects 503 (target objects) in the server merely records the clients name (step 412 in FIG. 5), completes the extra processing (step 414 in FIG. 5) and calls the original dispatch method to dispatch the method to the object.

Applications of the embodiments described above

Figure 9:
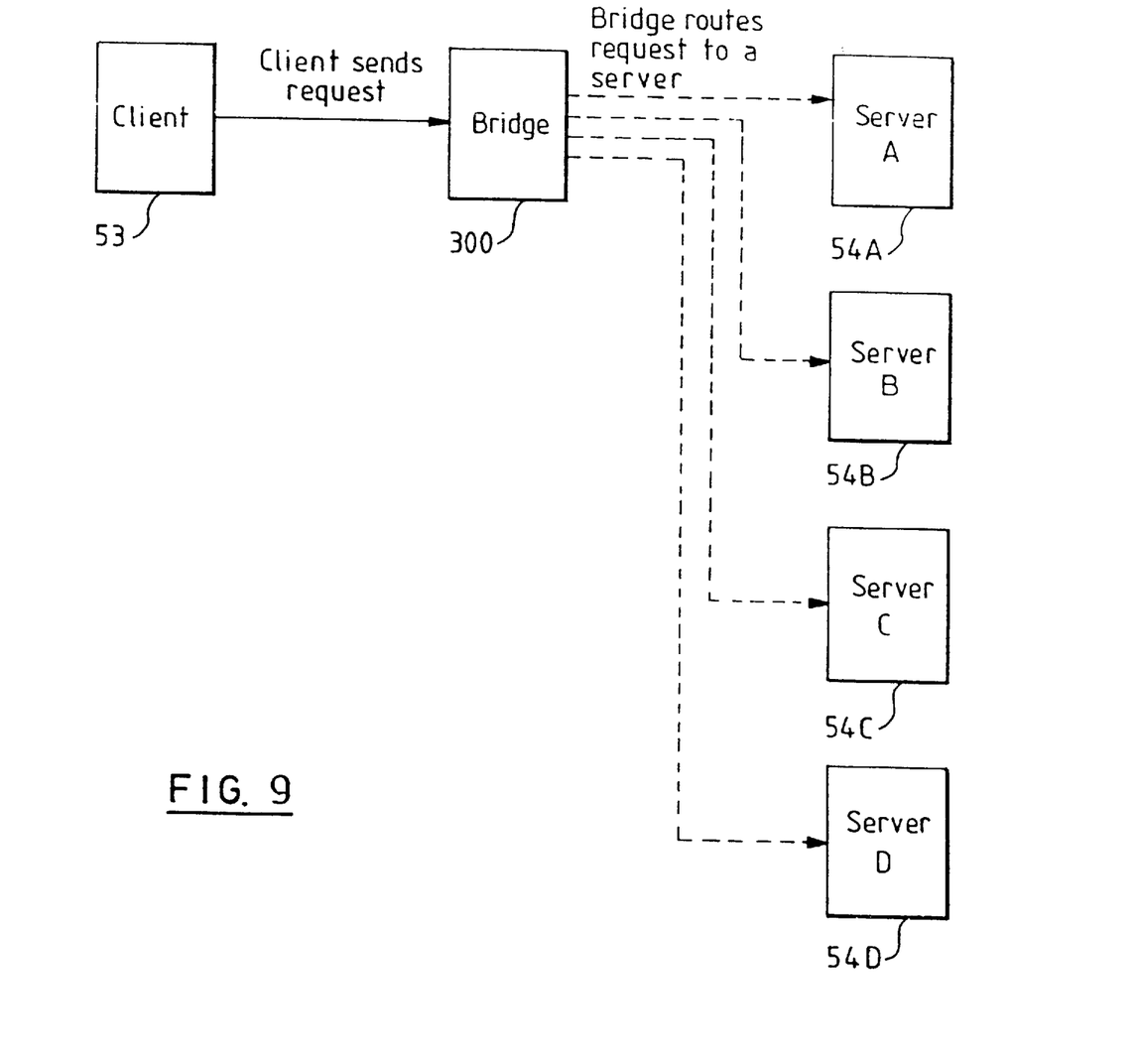
FIG. 9 is a block diagram showing workload balancing between multiple servers using a bridge according to the present invention.

Referring to FIG. 9, using the bridge 300 of the present invention which has been described above, a single client 53 can request services from multiple servers 54A–54D. The client 53 is unaware that the requests are being performed on different servers 54A–54D. The bridge 300 decides which of the multiple servers 54A–54D the request is to be directed to.

Workload balancing between each of the multiple servers 54A–54D can be achieved without any additional programming in either the client 53 or in the servers 54A–54D. In an embodiment which achieves workload balancing, the bridge 300 uses a "round-robin" algorithm. In this algorithm, each new client request is directed to the next server 54A–54D in sequence. In another embodiment to achieve workload balancing, response times obtained from each of the servers 54A–54D are measured and more sophisticated algorithms known to those skilled in the art are used to balance the workload between each of the servers 54A–54D. Both of these embodiments can be achieved without any modifications to the code in either the servers 54A–54D or in the client 53.

Figure 10:
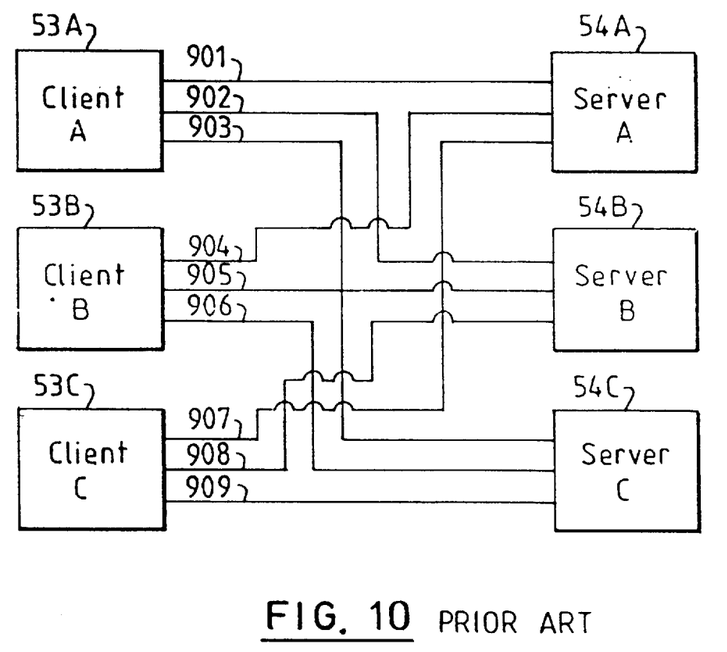
FIG. 10 is a block diagram showing prior art connection of multiple clients to multiple servers.

FIG. 10 shows three clients 53A–53C connected to three servers 54A–54C connected together in a prior art manner. Each of the clients 53A–53C has a connection 901–909 to each of the servers 54A–54C. Thus there are a total of nine connections 901–909 between clients and servers.

Figure 11:
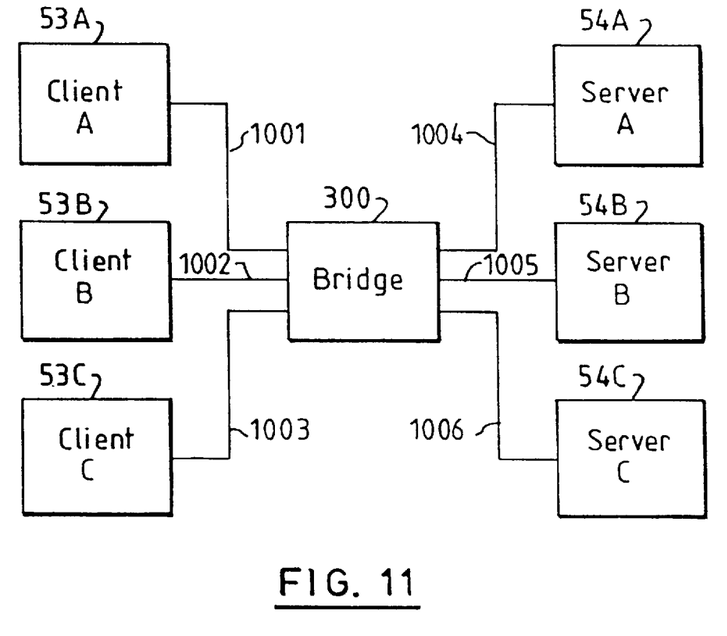
FIG. 11 is a block diagram showing connection of multiple clients to multiple servers using a bridge according to the present invention.

Referring to FIG. 11, with the bridge 300 of the present invention which has been described above, there can be multiple clients 53A–53C requesting services from multiple servers 54A–54C, without any of the clients 53A–53C being aware that the requests are being performed on different servers 54A–54C or that the servers 54A–54C are carrying out other requests for other clients 53A–54C. The bridge 300 decides which of the multiple servers 54A–54C each of the requests from each of the clients 53A–54C is to be directed to.

Connectivity in the network is reduced by routing all of the requests through the bridge 300. In a more generalised form, in a system having n clients 53 and m servers 54, the number of connections is reduced from n*m to n+m.

What is claimed is:

1. A bridge for use between a client and a server in a distributed object-oriented computer system, the bridge having an interface to the client that corresponds to the interface of a server and an interface to the server that corresponds to the interface of a client the bridge being transparently inserted between the client and the server so that the client and the server respectively communicate through the bridge as though directly interfacing with the server and the client respectively.

2. A bridge as claimed in claim 1 wherein:

said client and said server operate asynchronously;

said bridge is derived from a client and a server by inheritance;

said bridge overrides methods inherited from said server to record the name of the client making the request and to forward the request to said server; and said bridge overrides methods inherited from said client to forward reply parameters to said client.

3. A bridge as claimed in claim 1 wherein:

said client and said server operate synchronously;

said bridge is derived from a server by inheritance; and said bridge overrides methods inherited from said server to invoke said method on said server and to return reply parameters to said client.

4. A bridge as claimed in claim 1 further comprising means to monitor and log requests between the client and the server and data associated with such requests.

5. A bridge as claimed in claim 1 further comprising means for performing workload balancing between servers.

6. A bridge as claimed in claim 5 wherein said means for performing workload balancing measures response times and directs client requests to servers in response to said measured response time.

7. A bridge as claimed in claim 1 wherein:

said distributed object-oriented computer system comprises m clients and n servers (where n and m are integers greater than or equal to 2), each of said m clients being able to request services from each of said m servers;

said bridge is connected to said m clients and said n servers; and said bridge thereby reducing the number of connections between said m clients and said n servers from n*m to n+m.

8. A bridge as claimed in any one of claim 1 to claim 7 wherein said distributed object-oriented computer system is a CORBA compliant system.

9. A bridge as claimed in claim 8 wherein said distributed object-oriented computer system uses DSOM class libraries.

10. A distributed object-oriented computer system comprising one or more servers, one or more clients and a bridge as claimed in any one of claim 1 to claim 7.

11. A method of operating a distributed client-server computer system comprising the steps of:

defining an interface, for a bridge, such that the interface to a client corresponds to the interface of a server and the interface to a server corresponds to the interface of a client; and transparently inserting said bridge between said client and said server;

wherein the client and the server respectively communicate through the bridge as though directly interfacing with the server and the client respectively.

12. A method as claimed in claim 11 wherein said client and said server operate asynchronously, and said step of defining an interface comprises:

deriving said interface to a client from a server by inheritance;

overriding methods inherited from said server to record the name of the client making the request and to forward the request to said server;

deriving said interface to a server from a client by inheritance; and overriding methods inherited from said client to forward reply parameters to said client.

13. A method as claimed in claim 12 wherein said client and said server operate synchronously and said step of defining an interface comprises:

deriving said interface to a client from a server by inheritance; and overriding methods inherited from said server to invoke said method on said server and to return reply parameters to said client.

14. A computer program product in a computer readable memory for operating a distributed client-server computer system, the computer program product comprising:

means for defining an interface, for a bridge, such that the interface to a client corresponds to the interface of a server and the interface to a server corresponds to the interface of a client; and means for transparently inserting said bridge between said client and said server;

wherein the client and the server respectively communicate through the bridge as though directly interfacing with the server and client respectively.

15. A computer program product as claimed in claim 14 wherein said client and said server operate asynchronously, and said means for defining an interface comprises:

means for deriving said interface to a client from a server class by inheritance;

means for overriding methods inherited from said server class to record the name of the client making the request and to forward the request to said server;

means for deriving said interface to a server from a client class by inheritance; and means for overriding methods inherited from said client class to forward reply parameters to said client.

16. A computer program product as claimed in claim 15 wherein said client and said server operate synchronously, and said means for defining an interface comprises:

means for deriving said interface to a client from a server class by inheritance; and means for overriding methods inherited from said server class to invoke said method on said server and to return reply parameters to said client.

* * * * *